Figure 4:
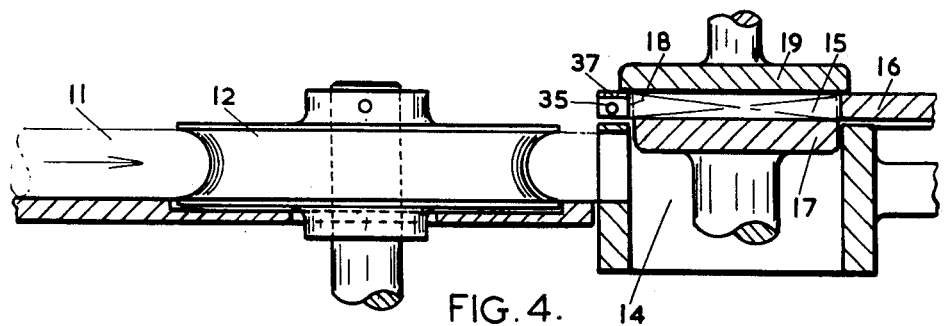

United States Patent [19]

Johnson et al.

[11] 4,159,612

[45] Jul. 3, 1979

[54] PRODUCTION OF LOLLIPOPS OR LIKE SWEETS

[75] Inventors: Reginald F. Johnson; Leonard Sutton, both of Gainsborough, England

[73] Assignee: Baker Perkins Holdings Limited, Peterborough, England

[21] Appl. No.: 845,633

[22] Filed: Oct. 26, 1977

[51] Int. Cl.$^2$ .................... B29C 3/02; B29D 3/00; A23G 3/12

[52] U.S. Cl. .................... 53/594; 425/126 S; 426/134

[58] Field of Search .............. 426/134, 392, 396, 410, 426/414, 512, 518, 660; 425/115, 117, 510, 126 S, 404, 445, 527; 264/259, 271, 138; 53/594

[56] References Cited

U.S. PATENT DOCUMENTS

| | | | |
|---|---|---|---|
| 971,097 | 9/1910 | Woolf | 425/126 S |
| 1,544,171 | 6/1925 | Pease | 53/594 |
| 1,594,418 | 8/1926 | Krout | 425/126 S |
| 1,689,879 | 10/1928 | Krout | 425/126 S |
| 1,699,559 | 11/1928 | Miller | 425/126 S |
| 1,958,380 | 5/1934 | Bottger et al. | 425/126 S |
| 2,014,593 | 9/1935 | Sergent | 53/594 |
| 2,246,243 | 6/1941 | Clark | 53/594 |
| 2,637,281 | 5/1953 | Latani et al. | 425/126 S |
| 2,660,963 | 12/1953 | Covert et al. | 425/126 S |
| 2,667,847 | 2/1954 | Carris et al. | 425/126 S |
| 2,705,857 | 4/1955 | Fox et al. | 425/126 S |
| 3,132,607 | 5/1964 | Hinckle | 425/126 S |
| 3,264,115 | 8/1966 | Davis | 426/134 |
| 3,285,199 | 11/1966 | Waite et al. | 425/126 S |
| 3,541,973 | 11/1970 | Aquarius | 425/126 S |
| 3,829,262 | 8/1974 | Aquarius | 425/126 S |

*Primary Examiner*—W. E. Hoag
*Attorney, Agent, or Firm*—Fitzpatrick, Cella, Harper & Scinto

[57] ABSTRACT

The invention relates to the production of lollipops or like sweets directly from a rope of toffee or the like which briefly comprises feeding the toffee rope into register with successive pockets of a forming conveyor for a leading portion of the rope to be severed and received by each pocket in turn to form an individual sweet, sticks being inserted successively into the sweets thus formed to complete the individual lollipops. An object of the invention is to ensure that the positional relationship between the stick and the sweet is accurately maintained during the various steps in the formation of the lollipop. This object is achieved according to the invention by resiliently nipping each stick against a guiding surface at each stage in the formation of the lollipop from the stick-inserting position to the delivery of the completed lollipop.

6 Claims, 12 Drawing Figures

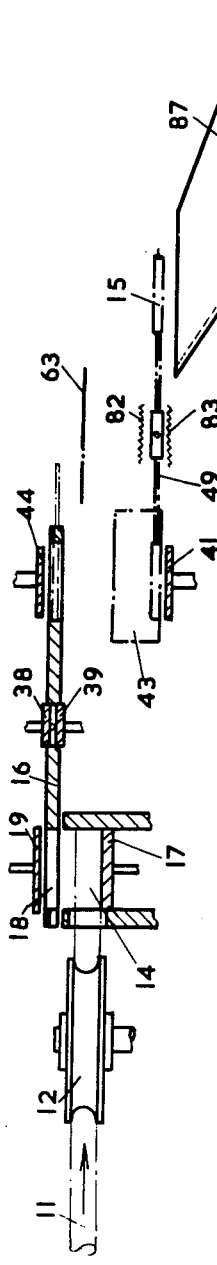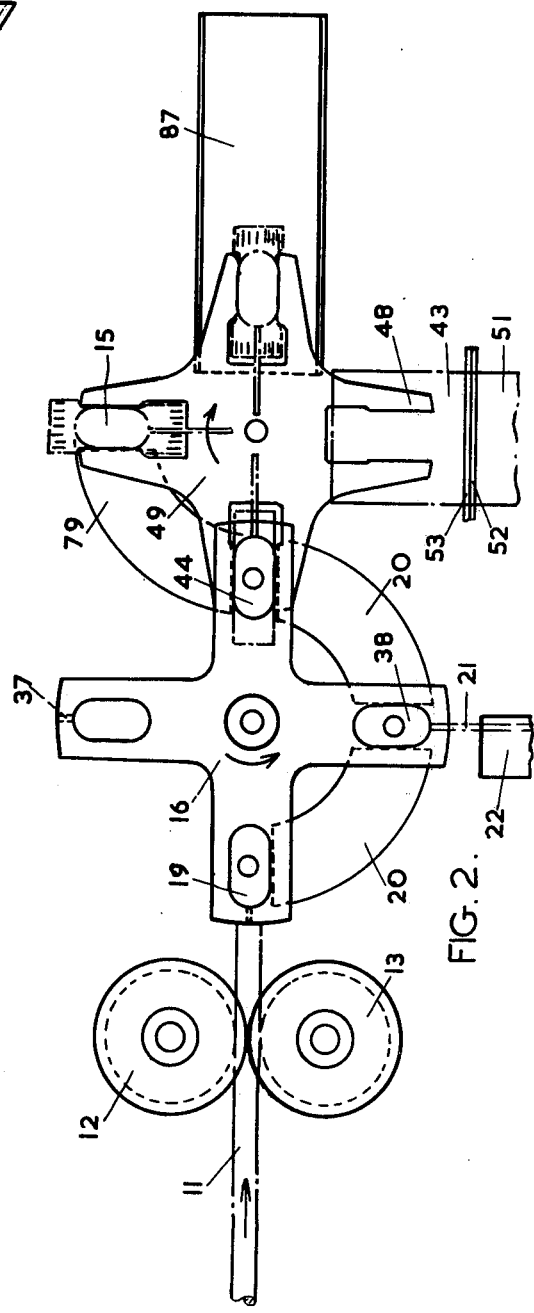

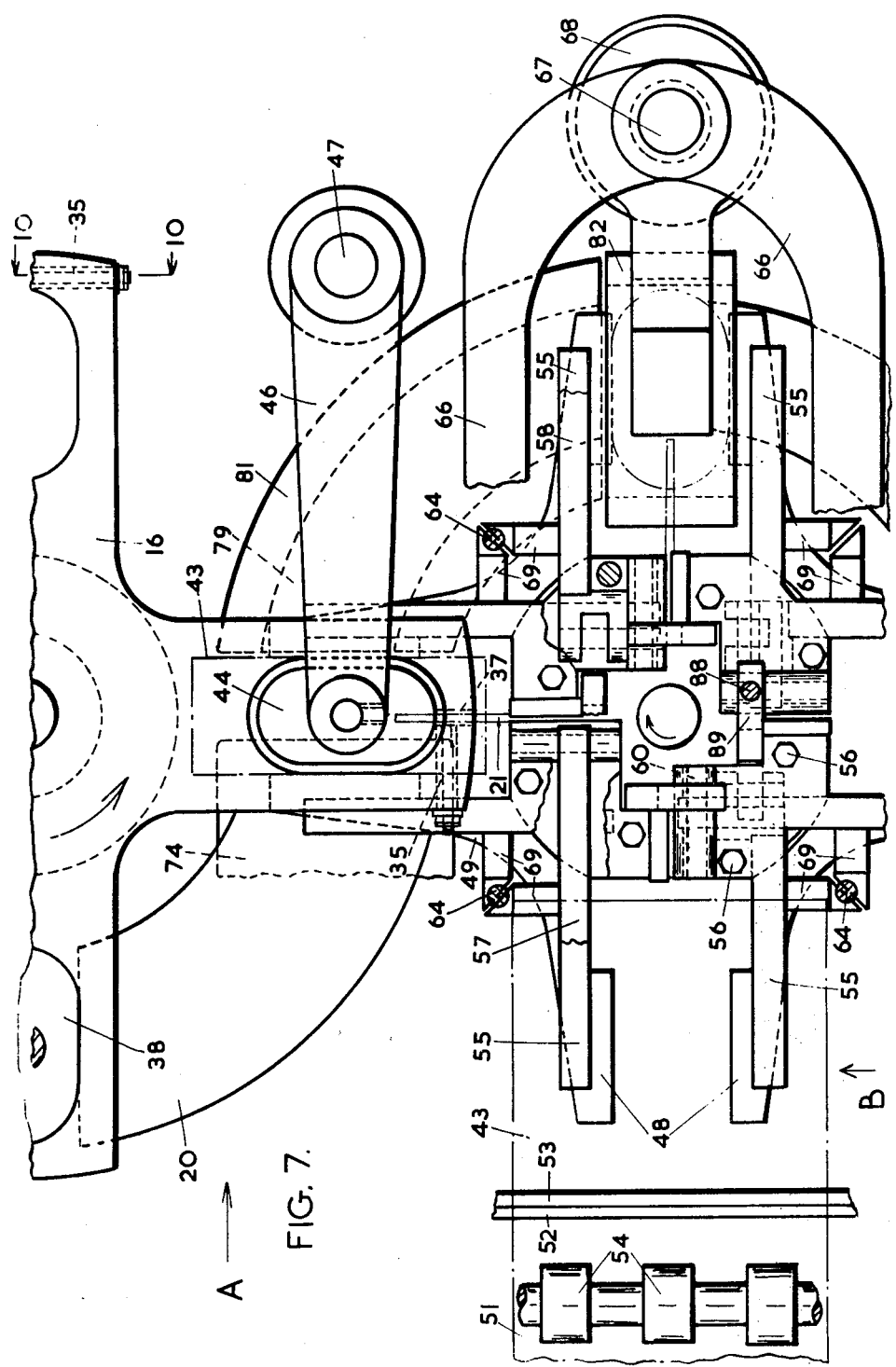

PRODUCTION OF LOLLIPOPS OR LIKE SWEETS

This invention relates to the production of lollipops or like sweets directly from a rope of toffee, sugar confectionery or the like (referred to hereinafter as "toffee rope") by the method (hereinafter referred to as the "described method") which comprises feeding a toffee rope into register with successive pockets of an intermittently movable forming conveyor as they are brought to rest at a forming station for a leading portion of the rope to be severed and received by each pocket in turn at that station to form an individual sweet, inserting sticks successively into the sweets thus formed and transferring the sweets from the pockets in succession, respectively, at subsequent stations.

A difficulty in this kind of operation lies in maintaining the positional relationship between the stick and the sweet during the formation of the lollipop. An object of the present invention is to alleviate this difficulty so as to produce a succession of sweets of consistently neat appearance.

According to the present invention, lollipops are formed by the described method characterised in that the toffee rope is first led into register with the pocket of the conveyor for the time being at rest at a first forming station, the leading portion of the rope is then severed and compressed into that pocket roughly to form an individual sweet, the conveyor is then moved to carry the sweet to a stick-inserting station at which a stick is guided and pressed into the sweet substantially simultaneously with a further compressing operation on the sweet finally to form it, resiliently nipping the stick meanwhile against a stickguiding surface so as to maintain a given positional relationship between the stick and the sweet, the conveyor is then moved to a delivery station while maintaining the resilient nipping pressure and the completed lollipop is then removed from the pocket.

The invention includes apparatus for carrying out the described method, said apparatus comprising an intermittently movable pocketed forming conveyor, means for feeding a toffee rope in timed relationship with said conveyor for its leading portion to be presented in register with successive pockets of said conveyor, means for severing such leading portion and compressing it into the pocket of the conveyor for the time being at rest at a first forming station roughly to form an individual sweet, means for indexing said conveyor to carry the sweet to a stick-inserting station, means for feeding a stick into and through stick-guiding means to be pressed into the sweet, and means, operating substantially simultaneously with the stick-feeding means, for compressing the sweet in the pocket finally to form it, the conveyor indexing means then again operating to carry the pocket to a delivery station, said apparatus being characterised by the provision of means for resiliently nipping the stick against a surface of said stick-guiding means during the stick-inserting operation and for maintaining the nipping pressure during movement of the pocket to the delivery station.

The forming conveyor is conveniently in the form of a wheel rotatable about a vertical axis and provided with circumferentially spaced pockets shaped in accordance with the desired shape of the sweets, the pockets being open at the top and bottom. With such construction, the stick-guiding means may consist of a slotted recess extending radially from the inner end wall of each pocket along the lower face of the forming wheel to the circumferential wall of the wheel. The stick-nipping means conveniently consists of a spring-loaded plunger slidably mounted in a bore extending at right angles to the axes of each recess.

Provision may be made for wrapping the completed lollipops by siting a wrapping wheel below the level of the forming wheel at the delivery station for rotation about a vertical axis, the wrapping wheel being formed with a series of open-ended pockets extending radially at spaced circumferential intervals, the wheel being arranged to be rotated intermittently to carry the pockets successively into register with the successive pockets of the forming wheel. In such a case, the invention may provide on the wrapping wheel means for maintaining the positional relationship between the stick and the sweet during the transfer of the lollipops from the forming to the wrapping wheels and also during the subsequent wrapping operations. Thus, after each lollipop has been transferred to the waiting pocket of the wrapping wheel, its stick is preferably resiliently nipped against a locating surface provided on the wrapping wheel, the nipping pressure being maintained until the wrapping operations are completed.

Figure 3:
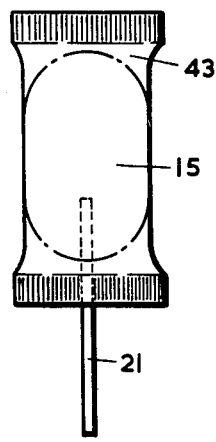
Figure 6:
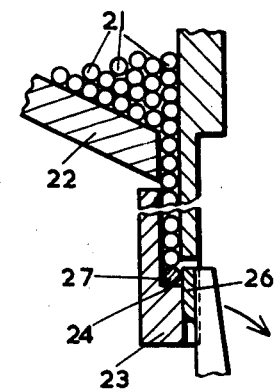
Figure 5:
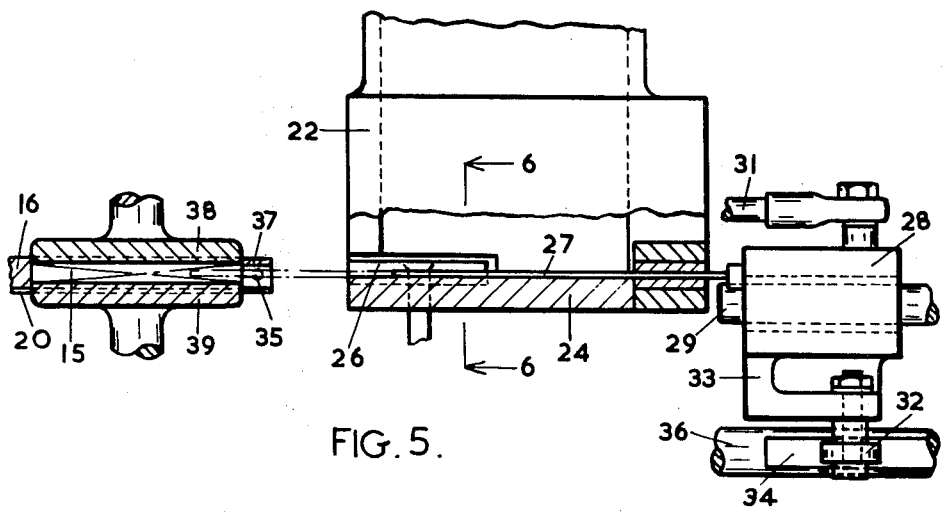
Figure 8:
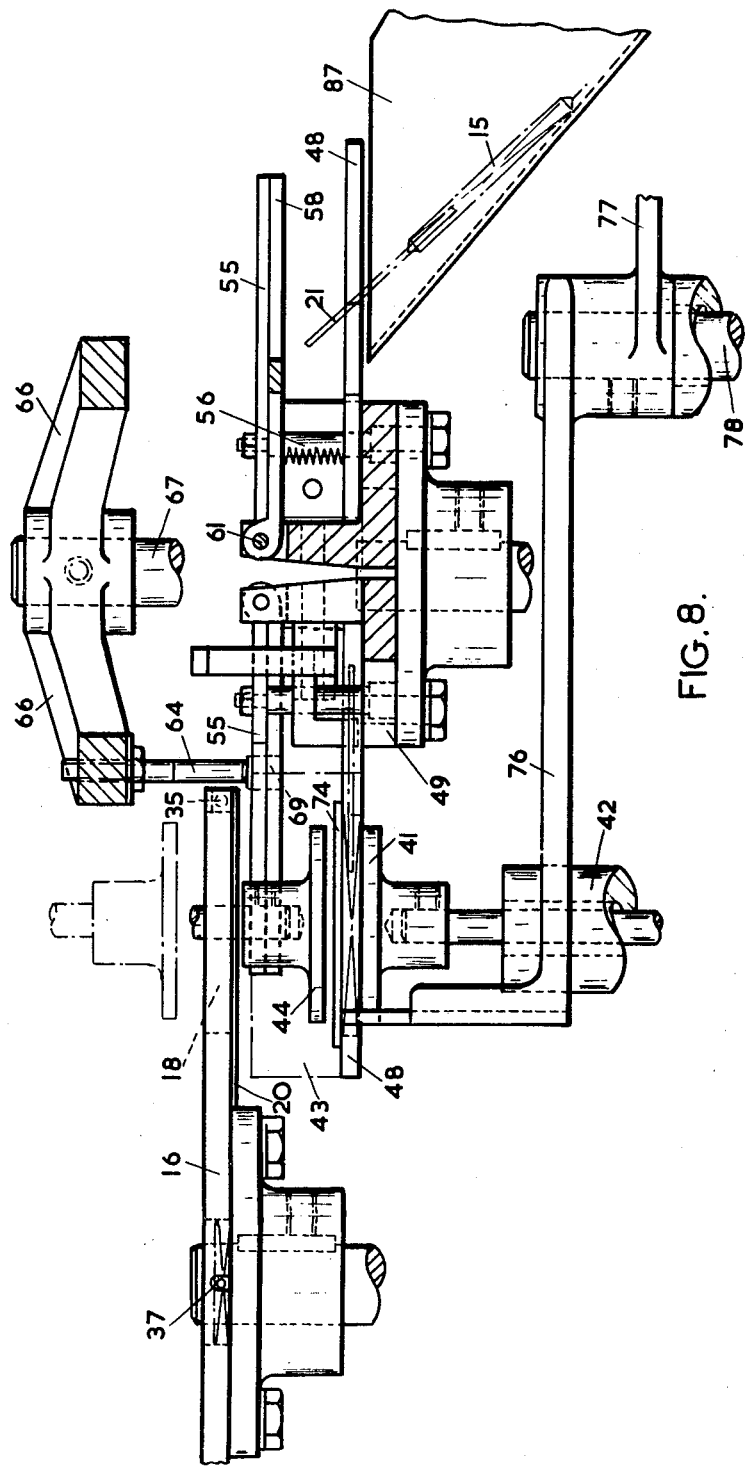
Figure 9:
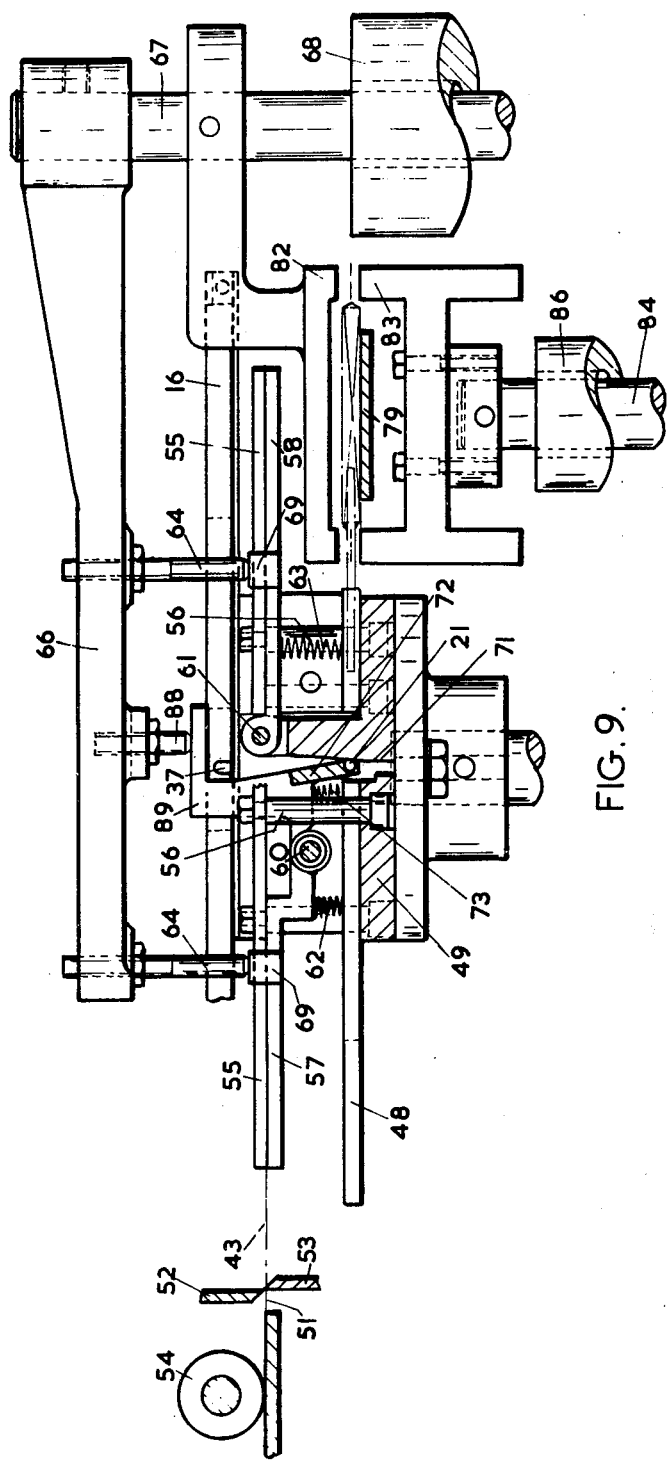
Figure 10:
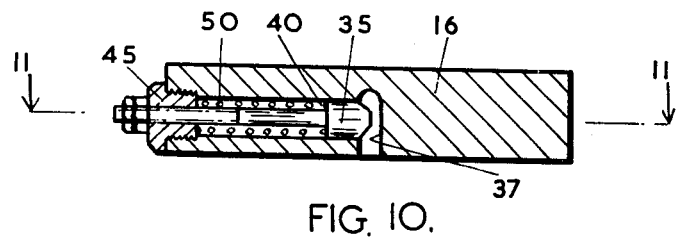
Figure 11:
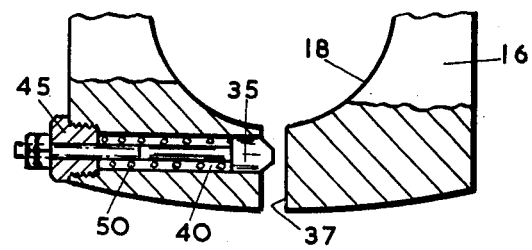
Figure 12:
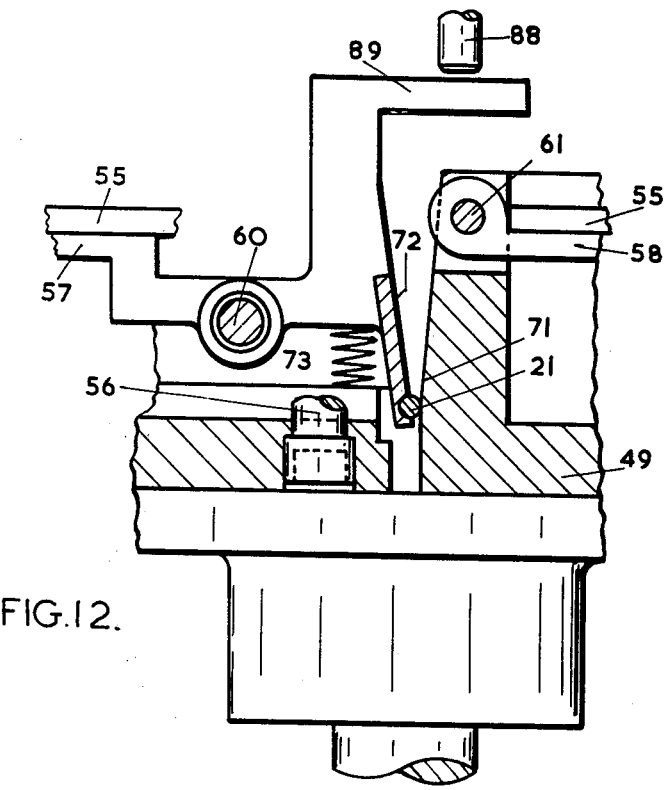

By way of example, the invention will now be described in greater detail with reference to the accompanying diagrammatic drawings, in which FIGS. 1 and 2 illustrate, in elevation and plan respectively, the general layout of a machine for the production of wrapped lollipops, FIG. 3 is an illustration of the wrapped lollipop produced by the machine, FIG. 4 is a sectional elevation of part of the machine illustrating the feeding and cutting stations, FIG. 5 is an elevation partly in section, of part of the machine illustrating the stick-inserting station, FIG. 6 is a section taken on the line 6—6 in FIG. 5, and drawn to a somewhat larger scale, FIG. 7 is a plan view of the machine illustrating the wrapper feed, sweet transfer, and wrapper sealing stations, FIG. 8 is a part sectional elevation of the machine, taken in the direction of the arrow 'A' in FIG. 7, FIG. 9 is a further part sectional elevation of the machine, taken in the direction of the arrow 'B' in FIG. 7, FIG. 10 is a sectional elevation of a detail of the machine taken on the line 10—10 in FIG. 7, and drawn to a somewhat larger scale, FIG. 11 is a sectional plan view taken on the line 11—11 in FIG. 10, and FIG. 12 is a part sectional elevation of a further detail of the machine.

TOFFEE ROPE FEED AND CUT-OFF STATION

Referring to FIGS. 1, 2 and 4, a freshly formed rope 11 of toffee is received by a pair of shaped feeding and forming rollers 12 and 13 which are intermittently driven to forward the leading portion of the rope 11 into a stationary cut-off chamber 14 located below an intermittently driven forming wheel 16. Arranged in the chamber 14, below the rope 11, is an intermittently operable plunger 17 which, when a length of rope 11 of sufficient volume to form a sweet 15 of the desired shape has passed into the chamber 14, is raised to sever the sweet from the rope 11 and transfer it into one of a series of pockets 18 formed in the wheel 16, a stationary upper plunger 19 arranged above the pocket 18 at the cut-off station co-operating with the plunger 17 to carry out a first forming operation on the sweet. At this position the plunger 17 presses the sweet against the plunger 19 so as to compress the sweet in the pocket to form it into the rough shape of the finished sweet but with clearance around the periphery of the pocket 18 so that a final compressing operation may take place at a later position. Upon retraction of the plunger 17 the wheel 16 is indexed to move the sweet to a stick-inserting station, the sweet being supported on an arcuate plate 20 during such movement.

STICK-INSERTING STATION

As shown in FIGS. 5, 6, 10 and 11, sticks 21 are contained in a magazine 22 the lower portion 23 of which is formed with a delivery channel 24 the base of which together with a movable arm 26 forming a guide for the lowermost stick in the magazine 22. The sticks 21 are removed, in succession, from the magazine 22 by a pusher 27 which is carried by a bracket 28 slidably mounted on a shaft 29 and reciprocated by a cam-operated link 31. To prevent rotation of the bracket 28 on the shaft 29 during operation a pair of rollers 32 (one only shown) is mounted on an extension 33 of the bracket 28 and arranged to run on flattened areas 34 formed on diametrically opposed portions of a spindle 36.

During the stick-inserting operation the stick 21 is guided into the sweet 15 by passing through a recess 37 formed in the lower face of the wheel 16 and extending from the inner wall of each pocket 18 to the circumferential wall of the wheel 16. Arranged in the outer marginal portion of the wheel 16 adjacent each pocket 18 is a plunger 35 slidably mounted in a bore 40, one end of the plunger 35 being provided with a tapered head which protrudes into the recess 37 while the other end is slidably mounted in a plug 45 itself secured in the outer portion of the wheel 16, lock nuts being provided to engage a threaded portion of the plunger to provide nicety of adjustment to the position of the head of the plunger in the recess 37. A spring 50 is positioned between the plug 45 and the head of the plunger 35 so that as a stick 21 is pushed through the recess and into the sweet as mentioned above, the plunger 35 is first depressed against the action of the spring 50 and then serves to nip the stick 21 against the opposing wall of the recess 37 under the urging action of the spring 50 to ensure that, as the wheel 16 rotates, no misalignment can occur between the stick and the sweet.

During insertion of the stick 21 a pair of plungers 38 and 39, arranged above and below the pocket 18 at this station and having the same peripheral shape as the pocket 18, are operated to effect the final forming operation on the sweet by moving into the pocket 18 into engagement with the upper and lower faces of the sweet 15 in the pocket 18 and compressing the sweet into its final shape, such compression also serving to compress the sweet around the stick 21. The plungers 38 and 39 are then retracted to allow the wheel 16 to index to a transfer station. As the wheel 16 is rotated the arm 26 is pivoted out of the path of movement of the stick 21 extending from the sweet 15. During rotation of the wheel 16 the sweet is supported on the plate 20.

TRANSFER AND WRAPPING STATIONS

Referring to FIGS. 7 and 8, as the wheel 16 comes to rest at the transfer station a support 41, formed in the shape of the pocket 18 and slidably mounted in a bearing 42, is raised into contact with the underside of the sweet 15 in the pocket 18. Prior to such movement a wrapper 43 is fed (in a manner described below) into the path of movement of the support 41 so that, as the support is raised, the wrapper is trapped between the underside of the sweet 15 and the support 41. An upper support 44 (also formed in the shape of the pocket 18), secured to an arm 46 slidably mounted on a rod 47, is lowered into the pocket 18 to contact the upper surface of the sweet 15 whereupon the supports 44 and 41 are lowered in unison to carry the sweet 15 and its wrapper 43 into one of a series of pairs of open ended pockets 40 formed in a wrapping wheel 49, during which movement the wrapper is folded around the sweet in the form of a 'U'.

WRAPPER FEEDING STATION

Referring to FIGS. 7, 9 and 12, the individual wrappers 43 are supplied from a web 51 of heat-sealable wrapping material which is severed at intervals by a pair of co-operating knives 52, 53 the web being fed towards the knives by feed rollers 54. Each wrapper 43 as it is severed is seized by one of a series of gripper units on the wrapping wheel 49, each unit consisting of a pair of upper grippers 55, secured to pillars 56 carried by the wrapping wheel 49, and lower movable grippers 57 and 58. Each gripper 59 is pivotally mounted on a stud 60 and each gripper 58 is pivotally mounted at 61 on the wrapping wheel 49, springs 62 and 63 urging the grippers 57 and 58, respectively, towards the fixed upper grippers 55.

The grippers 57 and 58 are opened against the action of the springs 62 and 63 by tappets 64 secured to a forked arm 66 secured to a shaft 67 slidably mounted in a bearing 68, the shaft being raised and lowered by a suitable cam arrangement (not shown). The tappets 64 engage mitred extensions 69 of the grippers 57 and 58 to open and close the grippers in timed relationship both with the wrapper feeding and severing mechanism and the movement of the sweet transfer supports 41 and 44. Thus, at the wrapper feeding station the grippers 57 and 58 are first opened by the tappets 64 and then released as the wrapper 43 is severed from the web 51 to grip the wrapper and transport it, as the wrapping wheel 49 rotates, towards the sweet transfer station. At this station the grippers 57 and 58 are again opened to release the wrapper as it is trapped between the support 41 and the base of the sweet 15 as mentioned above, the extensions 69 and tappets 64 being so positioned that the grippers are opened at the wrapper feeding station and the sweet transfer station simultaneously.

As each sweet 15 with its wrapper 43 is transferred into the wrapping wheel 49 the sweet 15 is positioned as mentioned above between the walls of the pocket 48 and maintained in that position by the protruding stick 21 being held against a wall 71 of a bearing member upstanding from the wheel 49 by a trapping member 72 pivotally mounted on the stud 60, a spring 73 urging the member 72 towards the wall 71 (see FIG. 12). With the sweet 15 thus held the supports 41 and 44 are retracted whereupon a movable folder blade 74 is operated to fold over the trailing upstanding portion of the wrapper 43 onto the upper face of the sweet 15 in known manner. The blade 74 is secured to one arm 76 of a two-armed lever 76, 77 pivotally mounted on a shaft 78 the arm 77 being actuated by suitable cam mechanism (not shown). With the wrapper held in this position the wrapping wheel is indexed to a sealing station. During this movement the sweet is supported on an arcuate plate 79 and the leading upstanding portion of the wrapper 43 is folded onto the already folded trailing portion by a stationary arcuate folder 81 in known manner. Thus, when the sweet arrives at the sealing station the wrapper 43 is folded around the sweet 15 in the form of an open-ended tube with portions of the tube extending from each end of the sweet. During the latter movement of the wrapping wheel 49 there will be a certain amount of drag exerted on the lower surface of the sweet 15 by the arcuate plate 79, and since the sweet at this stage is still in a 'soft' condition, it is important to ensure that the sweet is held against any sensible lateral displacement relatively to the axis of the stick 21. The pockets 48 perform such holding action and for this reason the lateral spacing of the walls of the pockets 48 is such that they closely embrace the sweet 15 without, however, exerting any gripping action such as would prevent the sweet from falling freely from the pockets when no longer supported by the plate 79.

WRAPPER SEALING AND DELIVERY STATIONS

As mentioned above, as the sweet arrives at the sealing station it is enveloped in an open-ended tube of heat-sealable wrapping material with portions of the tube extending from each end of the tube. At the sealing station there is provided upper and lower sealing members 82 and 83 respectively, which seal the wrapper by means of heat and pressure in known manner. The sealing member 82 is secured to the shaft 67 and the sealing member 83 is secured to a shaft 84 slidably mounted in a bearing 86, the shaft 84 being raised and lowered by suitable cam mechanism (not shown).

As the wrapping wheel 49 comes to rest at the sealing station the members 82 and 83 are moved to engage the extending portions of the wrapper 43 to effect a seal across those portions, opposing recesses 85 being cut in the members 82 and 83 to clear the stick 21 extending from the sweet 15. At the same time the longitudinal fold of the wrapper is heat-sealed by the member 82.

Upon retraction of the sealing members 82 and 83 the wrapping wheel 49 moves the wrapped lollipop to a delivery station at which a tappet 88 on the arm 66 engages an extension 89 of the trapping member 72 (see FIGS. 9 and 12) to move the latter away from the wall 71 against the action of the spring 73 to release the stick 21 and allow the lollipop to fall by gravity into a delivery chute 87.

From the foregoing description it will be seen that the machine will produce wrapped lollipops in such a manner that no misalignment can occur between the stick and the sweet during the forming and wrapping operations. Thus, once the stick has been inserted centrally into the sweet, this positional relationship is maintained by holding the stick and the sweet throughout the whole operation, firstly in the forming wheel 16 by the pockets 18 and spring loaded plungers 35 and then in the wrapping wheel 49 by the walls of the pockets 48 and the trapping members 72.

What we claim is:

1. Apparatus for producing sweets, said apparatus comprising an intermittently movable pocketed forming conveyor, means for feeding a toffee rope in timed relationship with said conveyor for its leading portion to be presented in register with successive pockets of said conveyor, means for severing such leading portion and compressing it into the pocket of the conveyor for the time being at rest at a first forming station roughly to form an individual sweet, means for indexing said conveyor to carry the sweet to a stick-inserting station, means for feeding a stick into and through stick-guiding means on said conveyor, and means for pressing said stick into said sweet, and means, operating substantially simultaneously with the stick-feeding means, for compressing the sweet in the pocket finally to form it, the conveyor indexing means then again operable to carry the pocket to a delivery station, said apparatus being characterised by the provision of means for resiliently nipping the stick against a surface of said stick-guiding means during the stick-inserting operation and for maintaining the nipping pressure during movement of the sweet in said pocket to the delivery station.

2. Apparatus as in claim 1, wherein the stick-nipping means consists of a spring-loaded plunger slidably mounted in a bore extending at right angles to the axes of each recess.

3. Apparatus as in claim 1 wherein the forming conveyor is in the form of a wheel rotatable about a vertical axis and provided with circumferentially spaced pockets shaped in accordance with the desired shape of the sweets, the pockets being open at the top and bottom.

4. Apparatus as in claim 3 wherein the stick-guiding means consists of a slotted recess extending radially from the inner end wall of each pocket along the lower face of the forming wheel to the circumferential wall of the wheel.

5. The combination with apparatus as in claim 1 of a wrapping apparatus comprising a pocketed wrapping member the pockets of which are arranged to move in succession into register with successive pockets of the forming conveyor at the delivery station, said wrapping member being provided with means for maintaining the positional relationship between the stick and the sweet during the transfer of the lollipops from the forming to the wrapping members and also during the subsequent wrapping operations.

6. Apparatus as in claim 5 wherein the wrapping member is in the form of a pocketed wheel provided with means for resiliently nipping the stick of each successive lollipop against a locating surface on the wrapping wheel.

* * * * *

UNITED STATES PATENT AND TRADEMARK OFFICE
CERTIFICATE OF CORRECTION

PATENT NO. : 4,159,612

DATED : July 3, 1979

INVENTOR(S) : REGINALD F. JOHNSON, ET AL

It is certified that error appears in the above-identified patent and that said Letters Patent are hereby corrected as shown below:

On Title Page, insert --[30] FOREIGN APPLICATION PRIORITY DATA  Nov. 3, 1976  Great Britain.......... 4562/76

Signed and Sealed this

Ninth Day of October 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,159,612
DATED : July 3, 1979
INVENTOR(S) : Reginald F. Johnson et al.

It is certified that error appears in the above—identified patent and that said Letters Patent is hereby corrected as shown below:

On Title Page, insert -- [30] Foreign Application Priority Data   Nov. 3, 1976   Great Britain.....45621/76   --.

THIS CERTIFICATE SUPERSEDES CERTIFICATE OF CORRECTION ISSUED October 9, 1979.

Signed and Sealed this

Fourth Day of March 1980

[SEAL]

Attest:

SIDNEY A. DIAMOND

Attesting Officer

Commissioner of Patents and Trademarks